April 8, 1930.　　　　L. H. PETERS　　　　1,753,903
CAN TESTING MACHINE

Filed April 25, 1928．　　　2 Sheets-Sheet 1

INVENTOR.
Louis H. Peters.
BY
Townsend, Loftus & Abbett
ATTORNEYS.

April 8, 1930.                L. H. PETERS                1,753,903
                           CAN TESTING MACHINE
                         Filed April 25, 1928        2 Sheets-Sheet 2
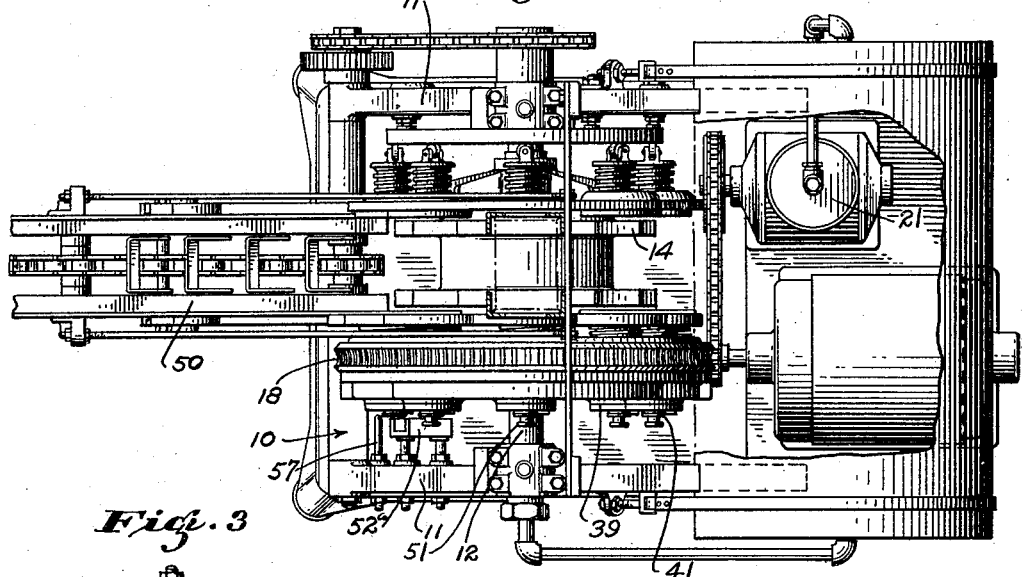
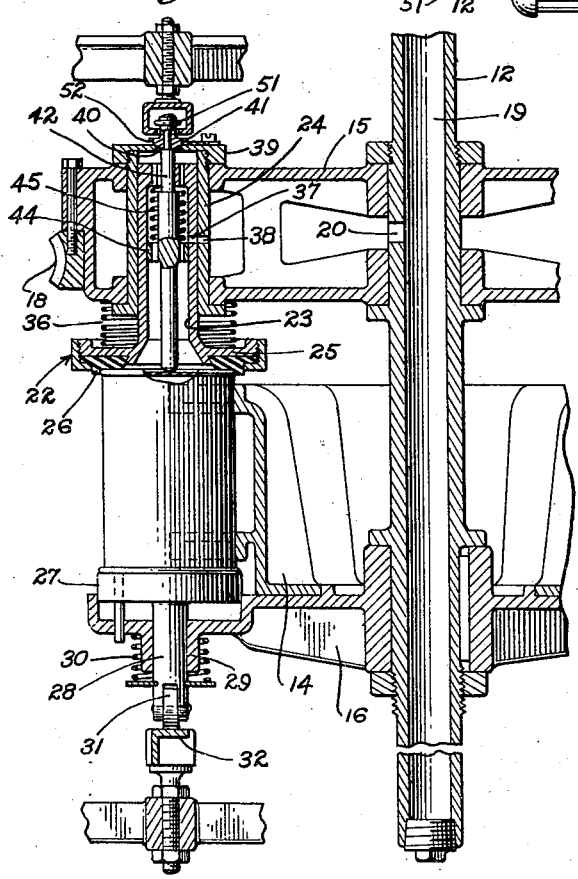
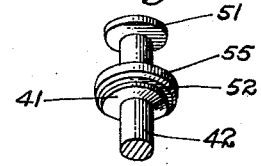
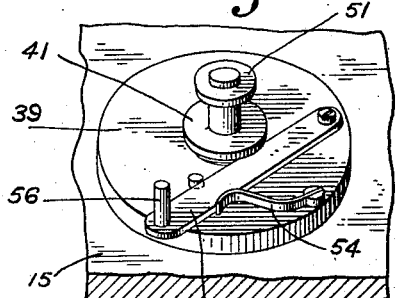
INVENTOR.
Louis H. Peters.
BY Townsend, Loftus & Abbett
ATTORNEYS.

Patented Apr. 8, 1930

1,753,903

UNITED STATES PATENT OFFICE

LOUIS H. PETERS, OF OAKLAND, CALIFORNIA

CAN-TESTING MACHINE

Application filed April 25, 1928. Serial No. 272,617.

This invention relates to can testing machines and particularly pertains to certain improvements on a prior apparatus disclosed in my United States Patent #1,648,660 issued to me Nov. 8, 1927.

This prior patent discloses a machine into which cans may be continuously fed and which applies a distending force to the end of each can sufficient to distend the end of the can in the event that the can is improperly evacuated. If the can is properly evacuated, the distending force maintains the can in the machine until the delivery point for the properly evacuated cans is reached. The distending force is then automatically discontinued and the can is ejected from the machine. In the event, however, that the can is improperly evacuated, the end of the can will distend and such distension operates a mechanism which discontinues the distending force so that the can will be ejected from the machine prior to reaching the delivery point for the properly evacuated cans. Under certain conditions is sometimes occurs that after the can end distends and renders the distending force ineffective the moment the distending force is rendered ineffective the can end snaps back into place and automatically re-establishes the distending force. When this occurs a faulty can is delivered with the properly evacuated cans.

It is the principal object of the present invention to provide means for preventing the distending force from being re-established during one cycle of operation on a can after the can end is once distended.

One form which the invention may assume is exemplified in the following description and illustrated by way of example in the accompanying drawings, in which:

Fig. 2 is a plan view of the same.

Fig. 3 is an enlarged fragmentary view in section through one of the can testing chucks.

Fig. 4 is a fragmentary view in perspective of one of the valves of the can chuck.

Fig. 5 is a fragmentary view in perspective of the outer end of one of the can chucks.

Figure 1:
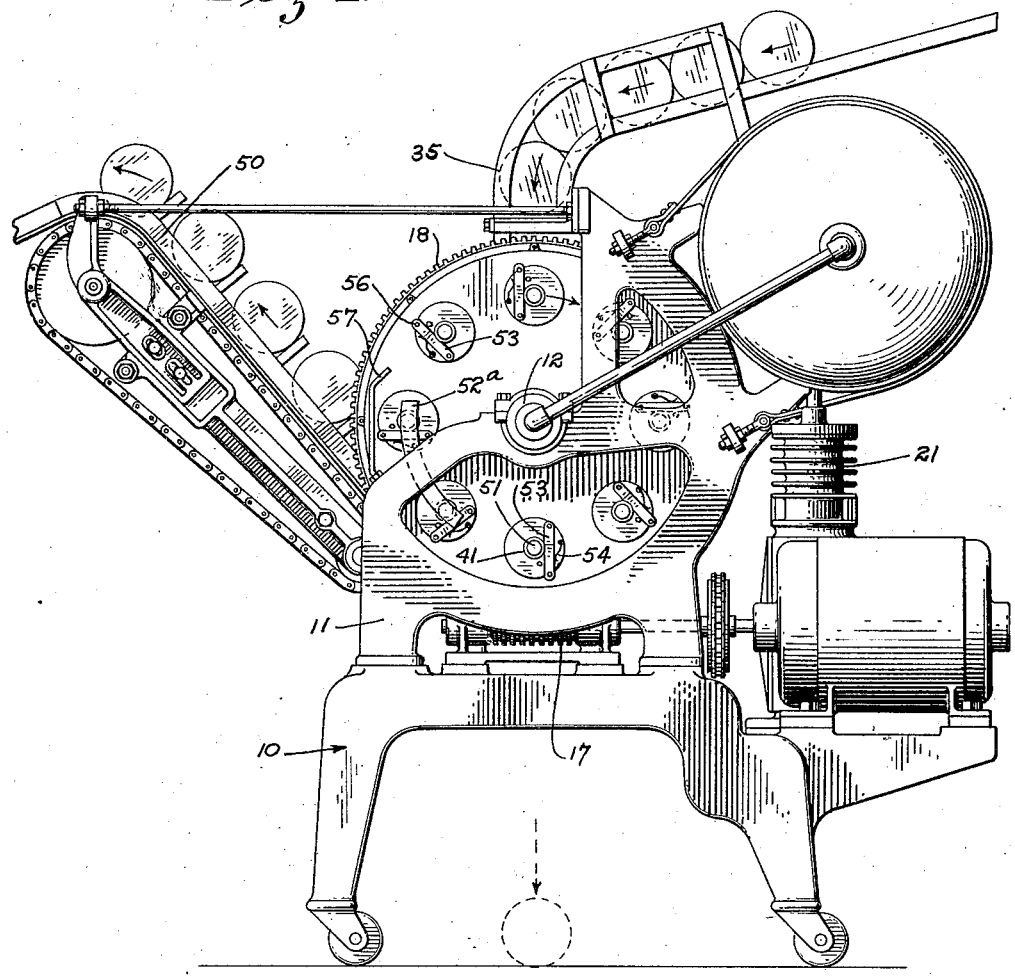
Fig. 1 is a side elevation of a can testing machine disclosing the preferred form of my invention.

In order that my invention may be properly understood I deem it advisable to herein describe the construction and operation of the principal elements of the machine. This machine is described and claimed in my prior application hereinbefore identified.

Referring more particularly to the accompanying drawings, 10 indicates a frame including a pair of spaced side frames 11 which are arranged in parallelism and extend vertically. These side frames 11 are fitted with aligned bearings which rotatably receive a horizontally disposed hollow shaft 12. Secured on the shaft 12 is a can receiving spider 14 and a pair of spaced head members 15 and 16.

The spider 14 and the head members 15 and 16 are all secured on the shaft 12 so that they will revolve in unison therewith. The spider 14 is formed at its periphery with a plurality of can receiving sockets spaced at equal distances apart about the circumference thereof.

The shaft 12 is continuously driven in one direction to drive the spider 14 and head members 15 and 16 by means of a motor driven worm 17 which meshes with a worm wheel 18 secured about the periphery of the head member 15. In the present instance I prefer to term the head member 15 as the suction head and this head is formed with a hollow suction chamber 19 which is in communication through a port 20 with the interior of the shaft 12. The bore of the shaft 12 communicates with a vacuum pump 21 through the medium of a tank and pipe. Mounted on the suction head 15 is a plurality of chucks 22 which are in axial alignment with the can receiving sockets on the spider 14. These chucks are arranged in a circle concentric to the shaft 12 and are spaced equal distances apart in direct alignment with the can sockets on the spider.

Each chuck comprises a hollow spindle 23 reciprocably mounted in a sleeve bearing 24 and extending through the suction head 15 and suitably secured thereto. At its inner end the hollow spindle 23 is fitted with a chuck plate 25 which is of a diameter larger than the can to be tested and is fitted with a rubber gasket ring 26 suitably secured on its face.

It will be noticed from Fig. 3 that when the can is positioned in the socket of the spider adjacent the chuck that it will be held between the gasket ring 26 on the chuck plate 25 and a face plate 27 mounted in the head member 16. One face plate is provided for each chuck.

As will be seen from Fig. 3 each face plate 27 comprises a flanged disk secured on a stem 28 which is reciprocably mounted on a stem guide 29. The disk reciprocates in a counterbore formed in the face of the head member 16. A spring 30 constantly tends to maintain the disk in its outermost position. The outer end of the stem 28 is fitted with a cam roller 31 which engages a cam track 32 secured on the frame. This cam track 32 as will be hereinafter described operates the face plate 27 during certain periods so as to retain the cans fed to the machine between the face plate and the chuck plate.

The cam track 32 is so designed that when the sockets in the spider 14 align with a can chute 35, the face plate 27 will be withdrawn permitting the can to drop into the aligned socket in the spider. As the can is moved out of alignment with the chute by reason of the rotation of the spider and chuck mechanism a rise in the cam track 32 causes the face plate 27 to move inwardly toward the chuck 22, clamping the can between the face plate 27 and the chuck plate 25. The raised rim of the can will be engaged by the gasket ring 26 forming a seal around the can end.

As disclosed in Fig. 3, the chuck 22 bears against a compression spring 36 so that inward movement of the face plate 27 will be transmitted through the can to the chuck 22, moving the latter outwardly a slight distance against the action of the spring 36. This movement, however, is sufficient to align a port 37 in the hollow chuck spindle with a port 38 in the sleeve guide 24 within which the spindle reciprocates. The alignment of the ports 37 and 38 places the interior of the spindle 23 in communication with the suction chamber in the head member 15. As the end of the chamber in the hollow spindle 23 is open at the chuck plate, the suction or vacuum created in the chamber will be applied to the end of the can contiguous to the chuck plate.

It is intended that this vacuum or suction be sufficient to distend the end of the can in the event that the can is not evacuated to a predetermined extent. That is to say, if it is determined that the can should contain six inches of vacuum, the vacuum in the chamber within the head member 15 is sufficiently greater than this six inches to overcome the resistance of the ends of all cans containing less than six inches of vacuum.

As previously stated it is intended to discharge all cans not evacuated to a predetermined point at a point of discharge other than that to which the properly evacuated cans are discharged. To accomplish this the outer end of the sleeve guide 24 is enclosed by a cap 39 having a centrally located valve opening 40 formed therethrough. This valve opening 40 is controlled by a poppet type of valve 41 secured on a valve stem 42. This valve stem is guided in the outer end of the hollow stem 23 and by a perforated plunger 44 which is reciprocably mounted in the bore of the hollow chuck spindle 23. A spring 45 is interposed between the outer end of the chuck spindle 23 and the perforated plunger 44 and constantly tends to maintain the valve 41 closed.

As will be seen in Fig. 3 the inner end of the valve stem 42 just barely engages the end of a can that is not distended. After the vacuum or suction is applied to the end of the can should the can end become distended, the valve stem 42 is moved outwardly by such distension and opens the valve 41 establishing communication between the atmosphere and the interior of the hollow spindle 23, thus breaking the vacuum. During this outward movement of the valve stem 42, the perforated plunger thereon closes the port 37 shutting off communication between the vacuum chamber in the rotary head 15 and the interior of the hollow chuck spindle 23.

When the vacuum is broken in the hollow spindle 23 the can is then held in position only by the medium of the clamping action of the face plate 27 against the chuck plate 22. The can then travels to a point almost diametrically opposite the point where the can enters the machine and at this point the cam track 32 is formed with a depression disengaging the face plate 27 from the can. This movement of the face plate 27 releases the can and as there is no suction holding the can to the chuck it will discharge from the machine.

In the event that the can end does not distend, the suction created on its end is maintained during this period of movement of the spider and is sufficient to retain the can in the spider until after it approaches a discharge conveyor 50. At this point the vacuum is automatically broken within the hollow guide stem by engagement of a button 51 on the valve stem with a trip shoe 52$^a$. Such engagement opens the valve 41, breaking the vacuum and permitting the can to discharge onto the conveyor 50.

I have found in actual practice that when rejecting cans of comparatively high vacuum, it sometimes occurs that the vacuum created on the end of the can causes the can end to distend so that the can will be rejected, but upon opening of the valve 41 due to the distension of the can end the atmospheric pressure causes the can end to snap back into place, re-applying the suction to the can end.

It sometimes happens that when this occurs the can that should be rejected passes the point of discharge for rejected cans and is delivered to the conveyor 50 which conveys the properly evacuated cans from the machine.

In the present instance I have provided means to insure that when a can end is once distended that the distending force or suction cannot be re-applied to the can. This I accomplish by forming a groove 52 around the upper end of the face of the valve 41. A lever 53 is pivoted at one end to the cap 39 and is urged by a spring 54 into this groove. When the valve is seated, the groove 52 is out of register with the lever 53 and the latter rides on the surface 55 of the valve 41. If the can end is distended and the valve 41 opened the spring 54 places the lever 53 into engagement with the groove 52 and prevents the valve from seating. Thus, after the can has been delivered to the machine and the suction applied to the end thereof, should the end distend, the valve 41 will be moved outwardly and unseated and the lever 53 will engage the groove 52 thereof, preventing the valve from seating; thus, the vacuum will be broken and be prevented from being re-established until after the can has been discharged.

Just prior to reaching the point where the cans are fed into the machine, the lever 53 is automatically disengaged from the groove 52 to permit the valve 41 to seat. This is accomplished by providing a projecting pin 56 on the free end of the lever 53. This pin 56 is adapted to engage a trip member 57 stationarily carried by the frame.

Reference being had to Figs. 1 and 2, it is seen that as the spider rotates the pins 56 of all the levers 53 will engage the trip member 57 and should they be in engagement with the grooves 52 of the respective valves 41 they will be disengaged therefrom. Immediately the lever is disengaged from a groove, the valve spring will seat the valve 41 and this valve will remain seated until after a can has been delivered thereto and its end distended.

In operation of the device, the cans are delivered to the machine as described and a distending force applied to the end thereof. If the can is not properly evacuated the end thereof will be distended and will open the valve 41. When the valve 41 is opened, the lever 53 will engage the groove 52 thereof and maintain it opened so that when the plate 27 is withdrawn, the can will discharge from the machine. Thereafter the pin 56 on the lever 53 will engage the trip 57 release the valve 41 and permit it to close.

If the end of the can does not distend, the suction created on the end thereof will hold it in place relative to the chuck after the plate 27 has been withdrawn until the valve 41 is opened by means of the automatic trip shoe 51. This point is adjacent the conveyor 50 so that the cans will be discharged on to the conveyor.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. An apparatus of the character described comprising can testing means adapted to travel in continuous cycles and to receive a can at a predetermined point in its cycle of operation, said testing means being adapted to cause the end of a can to distend in the event that the can is not sufficiently evacuated, means actuated by the distension of the end of a can being tested to render said distending force ineffective, and means for maintaining said distending force ineffective after the first-named means is actuated until the cycle of operation of the machine on the can being tested is completed.

2. An apparatus of the character described comprising can testing means adapted to travel in continuous cycles and to receive a can at a predetermined point in its cycle of operation, said testing means including means for creating a suction on the end of a can being tested to distend the end of a can not sufficiently evacuated, means automatically operated by the distension of the end of a can being tested to discontinue said suction, and automatically operating means associated with said means for preventing the re-establishment of the suction until the cycle of operation of the machine on the can being tested is completed.

3. An apparatus of the character described comprising can testing means adapted to travel in continuous cycles and to receive a can at a predetermined point in its cycle of operation, said can testing means being adapted to create a vacuum at the end of a can being tested, said vacuum being sufficient to cause distension of the end of the can in the event that the can is not sufficiently evacuated, valve means controlling said vacuum, said valve means being adapted to break said vacuum upon distension of the end of a can being tested, and automatically operating means associated with said valve for maintaining it in a position breaking said vacuum until the cycle of operation of the machine on the can being tested is completed.

4. An apparatus of the character described comprising can testing means adapted to travel in continuous cycles and to receive a can at a predetermined point in its cycle of operation, said can testing means being adapted to create a vacuum on the end of a can being tested sufficient to cause the distension of the end of the can in the event that the can is not sufficiently evacuated, normally closed valve means controlling said vacuum and adapted upon opening to break said vacuum, means actuated by the distension of a can end to open said valve to break the vacuum, and means associated with said valve to maintain the same opened after it has been opened by the distension of a can end until the cycle of operation of the machine on the can being tested is completed.

5. An apparatus of the character described comprising can testing means adapted to travel in continuous cycles and to receive a can at a predetermined point in its cycle of operation, said testing means being adapted to create a vacuum at the end of a can being tested sufficient to cause distension of the can end in the event that the can is not sufficiently evacuated, a normally closed valve controlling the vacuum, spring means constantly tending to maintain said valve closed, means engaged by the distended end of a can for opening said valve and thereby breaking the vacuum, and means engageable with the valve for maintaining the same open until the cycle of operation of the machine on the can being tested is completed.

6. An apparatus of the character described comprising can testing means adapted to travel in continuous cycles and to receive a can at a predetermined point in its cycle of operation, said testing means being adapted to create a vacuum at the end of a can being tested sufficient to cause distension of the can end in the event that the can is not sufficiently evacuated, a normally closed valve controlling the vacuum, spring means constantly tending to maintain said valve closed, means engaged by the distended end of a can for opening said valve and thereby breaking the vacuum, and means engageable with the valve for maintaining the same open until the cycle of operation of the machine on the can being tested is completed, said means automatically disengaging the valve after the cycle of operation of the machine on the can being tested is completed.

LOUIS H. PETERS.